United States Patent [19]

Yamamoto

[11] Patent Number: 4,493,975

[45] Date of Patent: Jan. 15, 1985

[54] HANG-UP HAIR DRYER

[75] Inventor: Katsumi Yamamoto, Chiba, Japan

[73] Assignee: Yamada Electric Industries Co., Ltd., Chiba, Japan

[21] Appl. No.: 430,731

[22] Filed: Sep. 30, 1982

[51] Int. Cl.[3] ........................ H01H 3/16; H02H 3/00; H05B 1/00

[52] U.S. Cl. ................................ 219/370; 200/61.79; 200/61.8; 219/242; 219/364; 219/518; 361/1

[58] Field of Search ............... 219/364, 366, 370, 379, 219/242, 246, 247, 518, 380, 243, 250, 432, 436, 522, 519; 200/61.5, 61.76, 61.79, 61.8, 85; 34/96–101; D28/13, 15, 17; 307/132 E, 326; 361/194, 1

[56] References Cited

U.S. PATENT DOCUMENTS

| | | | |
|---|---|---|---|
| 1,652,364 | 12/1927 | Kern | 200/61.79 |
| 1,681,291 | 8/1928 | Glass | 219/259 |
| 2,277,578 | 3/1942 | Booth | 361/194 |
| 2,586,910 | 2/1952 | Bolle | 200/85 R |
| 3,383,700 | 5/1968 | Taylor | 219/370 |
| 3,492,462 | 1/1970 | Schumacher | 219/373 |
| 3,602,660 | 8/1971 | Eslinger | 200/61.5 |
| 3,742,162 | 6/1973 | Waseman | 200/61.79 |
| 4,070,670 | 1/1978 | Chen | 219/519 |
| 4,292,542 | 9/1981 | Bajka | 307/326 |
| 4,366,366 | 12/1982 | Ekblad | 200/85 R |

FOREIGN PATENT DOCUMENTS

| | | | |
|---|---|---|---|
| 474232 | 8/1926 | Fed. Rep. of Germany | 219/246 |
| 681134 | 9/1939 | Fed. Rep. of Germany | 200/61.76 |
| 2395677 | 2/1979 | France | 219/379 |
| 2504366 | 10/1982 | France | 219/370 |

OTHER PUBLICATIONS

Page 96 of *Merchandising*, 1/83.

*Primary Examiner*—C. L. Albritton
*Assistant Examiner*—Geoffrey S. Evans
*Attorney, Agent, or Firm*—J. David Dainow

[57] ABSTRACT

An electric appliance safety system including a hand-held appliance, a power input for receiving electric current, a two-pole switch for activating the appliance, a power cord connecting the appliance with the switch and a pair of manually operable control elements operatively coupled to the two-pole switch for controlling its position. A hanger box encloses the switch and control elements, except for protruding portions of the control elements, and is adapted to receive the appliance. When the appliance is removed from the hanger box, the protruding portion of one of the control elements can be pressed manually, until latched on the other control element, thereby closing the switch and activating the appliance. When the appliance is hung on the hanger box, the protruding portion of the other control element is pressed down, thereby releasing the first control element, opening the switch, and disconnecting the appliance.

18 Claims, 8 Drawing Figures

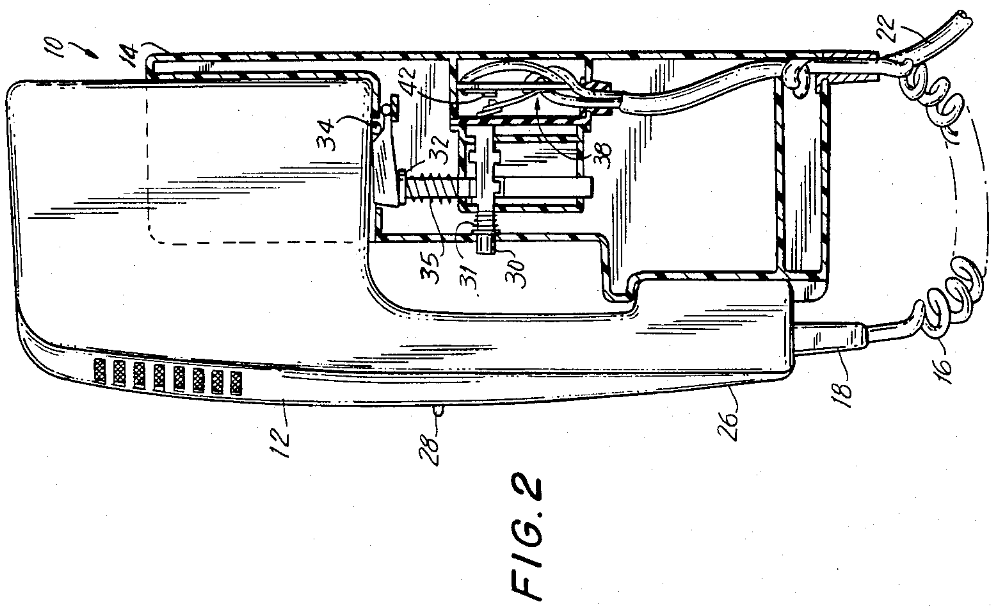
FIG. 2
FIG. 1
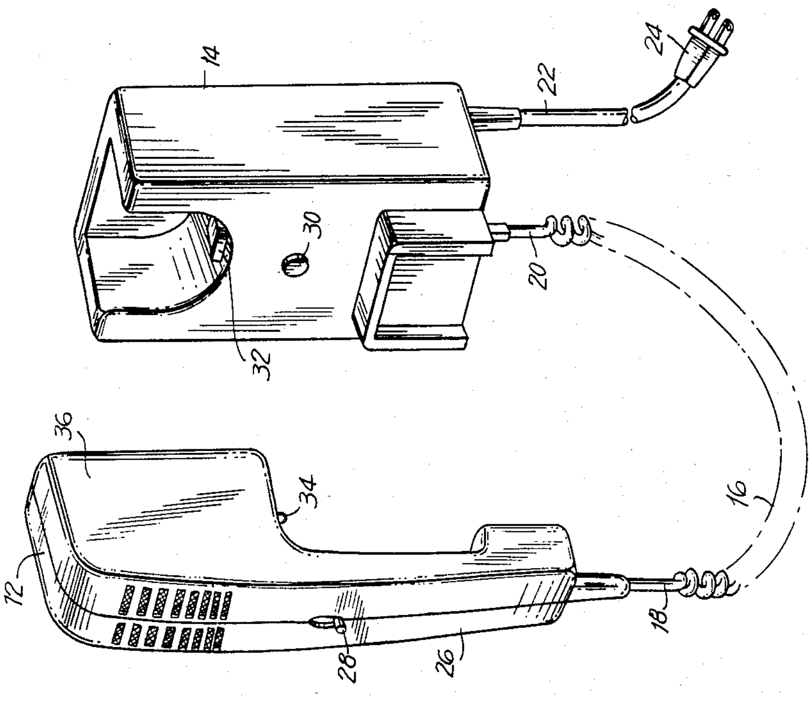

HANG-UP HAIR DRYER

BACKGROUND OF THE INVENTION

This invention is in the field of electrical safety for electrical home appliances of many types, including food preparation apparatus, personal care and convenience devices, and power tools. Examples of these many devices include hand-held hair dryers, shavers, electric toothbrushes, toasters, canopeners, blenders, heaters, fans, drills and sanders.

Particularly when personal care electrical products are used in a bathroom there exists a danger that an appliance which is plugged in but switched-off, may fall into a sink or tub of water and cause the user electric shock, burns or electrocution.

Both children and adults often err in thinking that a switched-off but plugged-in appliance is safe. Obviously the switch itself remains "hot", and thus the appliance remains dangerous.

Efforts and techniques currently used to try to reduce this danger include use of relatively short power cords to reduce the likelihood of a plugged-in product ever reaching the water; water proofing the switch and upstream circuitry; double-grounding the appliance; and using a ground fault interrupter.

Despite the incremental benefits or potential benefits from each of these techniques, none has been satisfactory when considering the practical reality of trying to implement such changes. Short power cords usually create such inconvenience for the user that the person will either purchase a competitive product with a longer cord or add an extension cord.

To waterproof the switch and upstream circuitry would require sealing parts of the appliance, which would be unacceptably expensive and usually would be impossible since the electric motors, where used, need air circulation for cooling. Double grounding the housing of an appliance may protect one person holding an appliance, but would not protect a person in a tub of water where the plugged-in appliance falls.

Finally, ground fault interrupts, while quite effective, are likely to cost more than the appliance itself, in addition to adding bulk and inconvenience for the user. As a result of such practical considerations, these devices have not been widely used.

SUMMARY OF THE INVENTION

This invention is a system and apparatus for reducing hazards of electric shock and current leakage in home appliances, particularly in the event that such an appliance is inadvertently dropped into a bathtub or sink filled with water. A principal objective is to render the appliance itself, including the typical electrical switch elements on the device and the wiring in and immediately adjacent to the device, electrically disconnected and dead when the appliance is not in use but still plugged into a wall receptacle power source. Typically power cord, when its remote end is plugged into a source, remains "hot" all the way to the switch member on the device. In the present invention the principal On/Off switch is situated near the end of the power cord remote from the appliance. Obviously one could simply disconnect the power cord from the typical wall socket; however this would be not only inconvenient, but would require an effort which most users would be unwilling to give and consequently the electrical hazard would persist.

A major object is providing the solution of the present invention has been to conceive of a system and apparatus which will be sufficiently feasible and convenient for the user to actually use same according to its design and intended purpose, and which will be sufficiently inexpensive for the manufacturers to actually incorporate same into the appliances.

The hang-up hair dryer of the present invention incorporates the principal On/Off switch in a support element called the hanger box, which is mounted on a wall and receives and holds the appliance, similarly as certain telephone instruments are hung on wall-mounted supports. The On/Off switch of the present invention is incorporated within the support element and situated such that the appliance when placed or hung on the support, contacts, presses and consequently turns off the principal power switch and renders the device non-electrified. Thereafter, if a user removes the device from the holder and accidentally drops it in a tub of water, the user would not be subjected to the electrical hazards described. In order to re-activate the appliance, one need only manually switch on the power switch within the wall-mounted support after the appliance is lifted off the support.

It is intended that users of the device described herein will rehang the appliance on the wall support when it is not in use and thereby automatically turn off the main power switch at the end of each use. The likelihood of the user following the above procedure is expected to be quite high, because failure to do so will leave the device operating, making noise, and continuing to use electric current. It is believed that typical users of appliances are sufficiently conditioned after the great number of years that appliances have been in use, to turn off a device which is running and making noise; consequently this invention and arrangement of a wall switch which is automatically turned off when the appliance is rehung on its support, will protect users from subsequent inadvertent accidents due to appliances falling into tubs.

In the above-described device the switch in the hanger box is turned off automatically simply by the weight of the appliance; however, obviously one could press the appliance down on the switch or manually press the switch without putting the appliance on it. Where the device is a hair dryer, typical additional controls include a temperature switch and a speed control switch for the fan which will be located on the handle of the appliance for convenience. Obviously these switches will have no effect unless the principal power switch at the hanger box is first turned on.

An additional feature to further reduce the electrical hazards is a waterproofing seal or diaphram generally covering or surrounding the electrical contact in the principal On/Off power switch. In this instance the manually movable switch or lever element engages the electrical contacts only through an intermediary or other non-conductive element which serves to seal the contacts from communication with water or other moisture.

In a further and different embodiment of the invention, the principal On/Off switch is again situated at the remote end of the power cord near the power source, but it is incorporated in a normally open magnetic relay. One can manually switch the relay to a closed position, which will then allow a secondary On/Off switch on the appliance to energize the appliance. However, when the secondary On/Off switch on the appliance is switched to the Off position, the relay also is de-energized and the principal power switch therein opens, thus rendering the appliance, its handle-mounted switch, and the remainder of the power cord deactivated and safe from the above-described hazards.

Typically in these embodiments the principal On/Off switch located remote from the appliance is an in-line two-pole switch which opens both the hot and ground lines simultaneously when switched off.

DESCRIPTION OF THE DRAWINGS AND PREFERRED EMBODIMENT

FIG. 1 is a perspective view of a hair dryer appliance and hanger box incorporating a switch of the present invention.

FIG. 2 is a sectional view of the appliance and hanger box of FIG. 1, with the power switch in the Off position.

FIGS. **6*a* and 6*b*** are section views of a further embodiment of the switch with a waterproof seal, in the switched On and switched Off conditions respectively.

Figure 5:
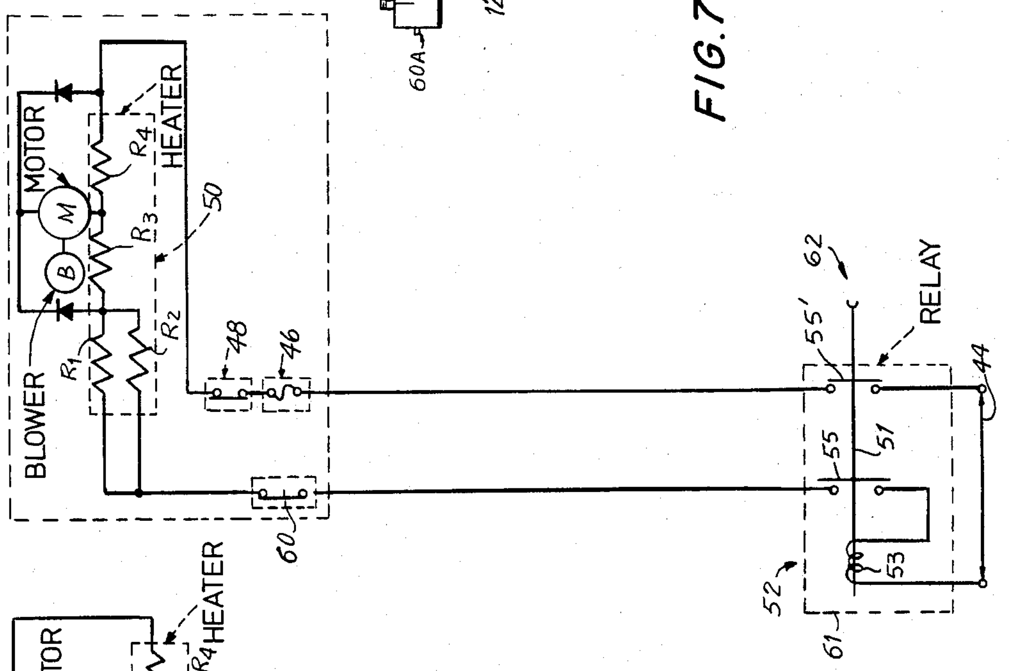
FIG. 5 is a circuit diagram of a second embodiment of the invention incorporating a relay switch.
Figure 7:
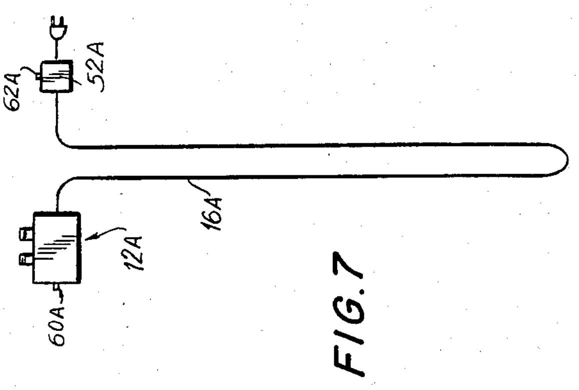

FIG. 7 is a schematic view corresponding generally to FIG. 1, showing an appliance and relay switch according to the circuit diagram of FIG. 5.

FIG. 1 illustrates the new invention 10 comprising a handheld hair dryer appliance 12, a wall-mounted control unit such as hanger box 14, and a power cord 16 having its near end 18 connected to the appliance and its remote end 20 connected to the hanger box. Also extending from the hanger box is the principal power cord 22 whose power input, such as plug 24, is connectible to a source of current not shown. The hair dryer 12 illustrated is of the hang-up type having an appearance somewhat like the speaker-microphone portion of a telephone instrument which can be hung on a wall-mounted support. On the handle part 26 of the hair dryer is a manual switch 28 for adjusting heat and/or speed of the air flow. As mentioned earlier, this switch means controls only the temperature and/or speed of the air and has no control as to whether the device is On or Off.

The wall-mounted hanger box 14 has within it an in-line two-pole switch for connecting or disconnecting the main power line 22 through the hanger box to power cord 16 and then to the appliance. Manual pressure on the level push button 30 will turn the internal switch (not shown) On and provided that push button 32 upwards; has been displaced manual downward pressure on push button 32 will open and turn Off the switch and simultaneously will enable push button 30 to be displaced outward. As discussed earlier, the placement of the appliance on the hanger box is indicated in FIG. 2 will result in the hooking pin 34 or other portion of the underside of the upper portion 36 of the appliance, contacting and pressing downward on the push button 32 in the hanger box, thereby switching Off the switch. The weight of the appliance will apply sufficient force to enable switching Off of the hanger box without required additional effort required by the user.

Figure 6A:
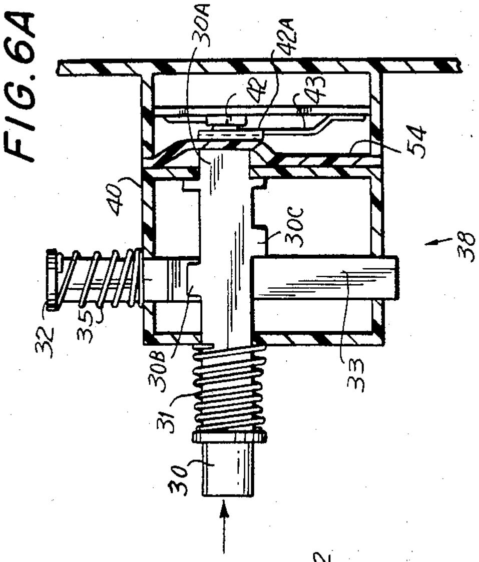
Figure 6B:
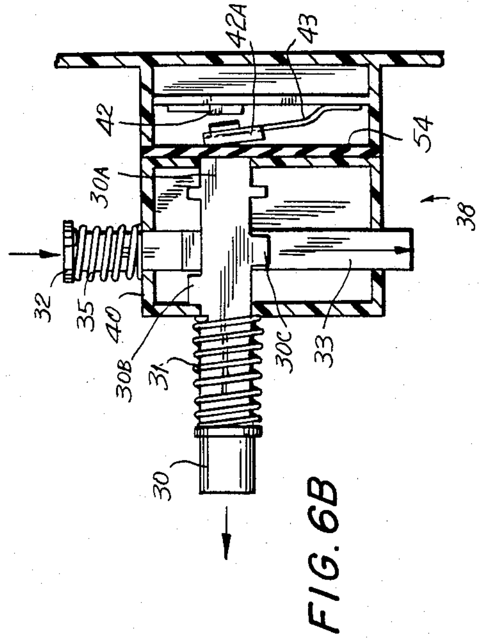
Figure 3:
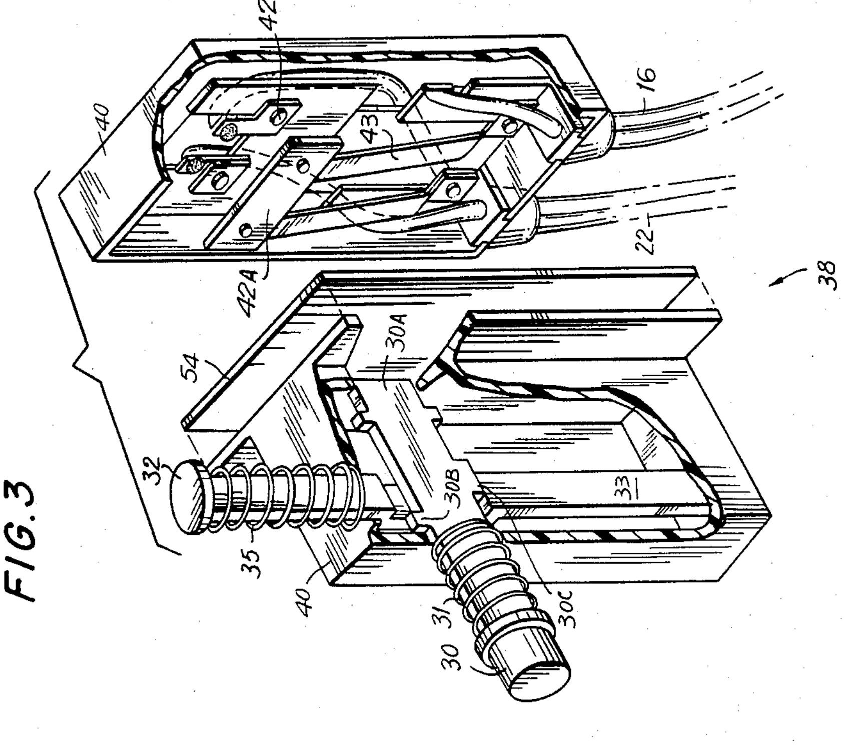
FIG. 3 is an enlarged perspective view, partially in section, of the switch in the hanger box of FIGS. 1 and 2.

The switch 38 is shown generally in FIG. 2 and in detail in FIG. 3 as follows: the two-pole switch 38 is contained in housing 40 with an input power line 22 and a power cord 16 leading to the appliance, and electrical contacts 42 are shown in open condition. The On button 30 is shown poised for its remote end 30A to engage and drive bar 42A of the contact to its closed position. Contact bar Bar **42*s* is rigidly mounted on flexible members 43. Pressing button 30 requires the user to overcome the resistance of spring 31 which normally urges button 30 outward so that the contacts take a normally open position. Button 30 is preferably positioned behind the appliance so that it cannot be operated until the appliance has been removed from the hanger box. The button 30 may have a projection 30B inhibiting its depression unitl the button 32 has been released, by removal of the appliance, to spring upwardly. Movement of button 30 inward to the closed position allows shaft 33 of button 32 to spring upwardly, as shown under the bias of spring 35, and contracts 42 are latched in a closed position by means of a projection 30C on the button 30 engaging the released shaft 33. This causes the button 30 to remain depressed until subsequent disconnection by pressure upon release button 32** as a result of rehanging of the appliance or manual control by the user.

Figure 4:
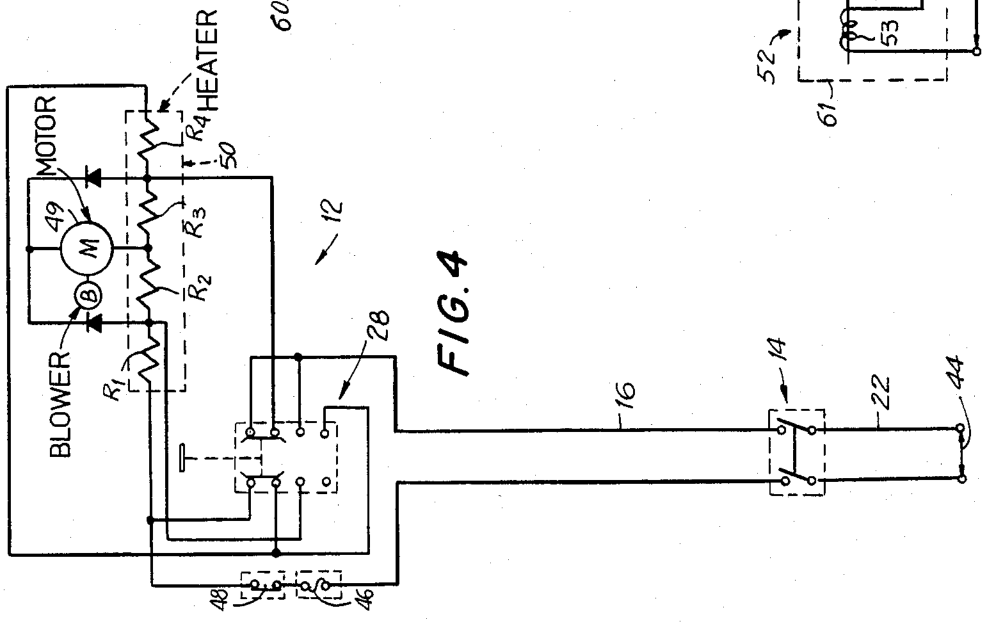
FIG. 4 is a circuit diagram of the apparatus of FIGS. 1 and 2.

FIG. 4 provides a circuit diagram of the device of FIGS. 1 and 2 which shows a first section of power line 22 connectible to power source 44, and a second cord 16 extending between the hanger box and the appliance 12. Item 46 is a fuse for protecting the circuit from overload, and item 48 is a sensor and switch to protect the apparatus from excessive temperature. Item 28 corresponds to the switch on the handle of the appliance for varying the heat and speed. It is of course apparent that any other conventional heat and/or speed changing switch arrangement may alternatively be employed, and that such a control may also be omitted. The motor 49 is for the blower of the hair dryer and resistances R1 through R4 represent the heater elements of heater 50 in the dryer.

FIG. 5 is a circuit diagram having certain similarities to FIG. 4; however the dryer herein has a secondary On/Off push button switch 60 on the handle or other part of the appliance. A magnetic relay switch 52 having an armature 51 and coil 53 is provided in a unit 61 in the vicinity of the remote end of the power cord. The relay 52 is normally open, but is provided with a manual button 62 affixed to its armature 51 so that the contacts 55, 55 thereof can be manually moved to the closed condition. This allows current to flow to the appliance only if its own On/Off switch 60 is moved into the closed condition. When the user moves the handle switch 60 to Off the condition and current ceases to flow through the magnetic coil 53 of the relay, the relay automatically returns to its open condition where it remains until manually closed again at such time that the user wishes to use the appliance. With this arrangement the appliance and the power cord between it and the relay become de-energized the moment the user turns off the appliance, as opposed to the device represented by FIG. 4 which becomes de-energized only after the appliance is repositioned on the hanger box or the user actually goes to the hanger box and manually pushes the reset button 32.

FIGS. **6*a* and 6*b* illustrate a varied embodiment of the On/Off switch in the hanger box where a rubber packing or diaphragm or equivalent seal 54 is interposed between the switch's push button 30 and the electrical contacts 42. The result is that the contacts and the primary power cord 22** to the source of current are isolated from the hazard of water by the waterproof membrane.

In FIG. 7 the relay 52A is shown adjacent the remote end of the power cord 16A, as used with any electrical appliance 12A. The relay has its reset button 62A, and the appliance has its secondary On/Off switch 60A.

The apparatuses described above are merely preferred embodiments of the subject invention; many other embodiments are possible within the scope and spirit of this invention as defined in the appended claims.

What is claimed is:

1. An electric appliance system comprising an appliance adapted to be held in an operator's hand, a support housing means adapted to receive said appliance, a power input extending from said support having means for receiving electric energy from a voltage source, a two-pole switch means housed in said support housing means and connected to said power input for enabling application of said electric energy to said appliance, a power cord extending between said switch means and appliance for applying electric energy to said appliance, and a manually operable control means operatively coupled to said switch means for controlling said switch means, wherein said power cord is connected and disconnected from said power input when said switch means is in the ON and OFF positions, respectively, said appliance including terminals connected across said voltage source and bearing load current when said two-pole switch means is in a closed ON position, said terminals each being electrically isolated from said voltage source when said two-pole switch means is in the open OFF position.

2. The appliance system of claim 1 wherein siad control means is incorporated in said support housing means and comprises first and second latchable members which are latchable with respect to each other, each of said latchable members having first and second positions corresponding to the ON and OFF positions of said switch means, wherein said first latchable member is positioned in its first position in response to the application of manual pressure on said first latchable member after removal of said appliance from said support housing means, and said second latchable member is positioned in its second position in response to the application of pressure on said second latchable member when said appliance is placed on said support housing means.

3. The appliance system of claim 2 wherein each of said latchable members is a rigid pin, said first latchable member is provided with first and second projections, and said second latchable member is provided with a second latchable member, said latchable members being latched relative to each other by means of said projections engaging said groove.

4. The appliance system of claim 2 wherein said power input comprises first and second electrical conductors, said switch means comprise first and second contacts connected respectively to said first and second electrical conductors and a contact bar mounted on support means and connected to said power cord, said support means being resiliently biased to resist movement of said contact bar toward said contacts, said contact bar being driven to a position against and across said contacts corresponding to the on position in response to said first latchable member being positioned in its first position, thereby connecting said power cord away from said contacts corresponding to the Off position in response to said second latchable member being positioned in its second position, thereby disconnecting said power cord and power input.

5. The appliance system of claim 3 wherein movement of said first latchable member toward its first position is blocked by said first projection when said latchable members are in said second positions, and movement of said first latchable member toward its second position is blocked by said second projection when said latchable members are in said first positions.

6. The appliance system of claim 4 further comprising first and second spring means, wherein said first latchable member is resiliently biased away from its first position by said first spring means, and said second latachable member is resiliently biased away from its second position by said second spring means, said first latchable member being unlatched and urged toward its second position when said second latchable member reaches its second position.

7. The appliance system of claim 1 wherein said support housing means is adapted to be hung on a wall.

8. The appliance system of claim 1 and further comprising therefor a pushbutton switch arranged on said appliance and having ON and OFF positions, and said switch means comprises a relay having a manually controllable armature, at least one set of contacts on said armature, and a coil electrically connected to a contact, said pushbutton switch being connected to said relay such that said relay is energized in response to said armature contacts being manually closed when said pushbutton switch is in the ON position and said relay is swiched Off in response to said pushbutton switch being manually moved to its OFF position.

9. The appliance system of claim 8 wherein said power input comprises a pair of electric conductors, each of said electric conductors being electrically connected to a corresponding contact of a corresponding set of said contacts arranged on said armature for connecting said power cord with said power input.

10. The appliance system of claim 1 wherein said appliance comprises a variable speed motor and a speed switch means for controlling the speed of said motor.

11. The appliance system of claim 1 wherein said appliance comprises a heater and a heater switch means for controlling the current applied to said heater.

12. The appliance system of claim 1 wherein said appliance comprises a hand-held hair dryer.

13. The appliance system of claim 2, wherein a portion of each of said latchable members protrudes through said support housing means and said appliance further comprises a hooking means which engages the protruding portion of said second latchable member.

14. The appliance system of claim 1 further comprising a flexible layer of insulating material arranged between said control means and said switch means for electrically insulating said control means.

15. In a hand-held hair dryer operable with a source of electrical current comprising a housing, a blower, including a motor a manually operable switch arranged on said housing for controlling said motor and heater, circuit means arranged in said housing for connecting said switch with said blower and heater, and a power cord having a near end electrically connected to said circuit means and a remote end for connection to said source, the improvement in combination therewith comprising a wall-mountable support housing for removably supporting said dryer, a two-pole switch having ON and OFF positions, and being arranged in said support housing and wired in-line with said power cord at said remote end, and first and second manually operable control elements partially protruding from said support housing, each of said control elements having first and second positions for controlling said switch, said first and second positions corresponding to the ON and OFF positions of said switch, wherein said first control element is moved to its first position in response to the application of manual pressure on its protruding portion, whereby said appliance is turned ON, and said second control element is moved to its second position in response to the application of pressure on its protruding portion when said appliance is placed on said support housing, whereby said appliance is turned OFF.

16. An electric appliance system comprising:

(a) an appliance adapted to be held in the operator's hand;

(b) a wall-mountable hanger box adapted to receive said appliance;

(c) a power input at said hanger box for receiving electric energy;

(d) a two-pole switch means for enabling application of said electric energy to said appliance;

(e) a power cord extending between said switch means and appliance for applying electric energy to said appliance; and (f) a manually operable control means for turning on said appliance, wherein said appliance receives electric energy in response to manual operation of said control means, and said control means are arranged on said hanger box, said appliance including terminals connected to said power cord and receiving said electric energy and bearing load current when said two-pole switch means is in a closed ON position, said terminals each being electrically isolated from said electric energy when said two-pole switch means is in the open OFF position.

17. In an electrical appliance having an ON/OFF switch arranged thereon and a power cord, said power cord havig a near end connected to said ON/OFF switch and a remote end for receiving electric energy from a power source, the improvement in combination therewith comprising a relay switch connected at said remote end of said power cord, said relay switch comprising, a coil, a pair of contacts, and a manually operable control element for manually closing said contacts whereby said coil and appliance are energized in response to said ON/OFF switch being moved to its ON position, said contacts being held closed in response to energization of said coil, and said contacts being opened in response to said ON/OFF switch being moved to its OFF position whereby said appliance is completely deenergized, said appliance including terminals connected across said power source and bearing load current when said pair of contacts is in a closed ON position, said terminals each being electrically isolated from said power source when said pair of contacts is in the open OFF position.

18. The electrical appliance of claim 17, wherein said relay switch is located within one foot of said power source.

* * * * *